United States Patent
Tomizawa et al.

(10) Patent No.: US 11,402,701 B2
(45) Date of Patent: Aug. 2, 2022

(54) DISPLAY DEVICE COMPRISING A PLURALITY OF FIRST AND SECOND SUBPIXELS WHEREIN COMPONENTS OF ONE SUBPIXEL OF THE FIRST SUBPIXELS ARE DISTRIBUTED TO THE PLURALITY OF SECOND SUBPIXELS

(71) Applicant: Japan Display Inc., Tokyo (JP)

(72) Inventors: Kazunari Tomizawa, Tokyo (JP); Tsutomu Harada, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/335,504

(22) Filed: Jun. 1, 2021

(65) Prior Publication Data

US 2021/0373369 A1 Dec. 2, 2021

(30) Foreign Application Priority Data

Jun. 1, 2020 (JP) .............................. JP2020-095484

(51) Int. Cl.
*G02F 1/1343* (2006.01)
*G09G 3/36* (2006.01)
*G02F 1/1362* (2006.01)
*G09G 3/20* (2006.01)
*G02F 1/1335* (2006.01)

(52) U.S. Cl.
CPC ...... *G02F 1/134345* (2021.01); *G02F 1/1362* (2013.01); *G09G 3/2074* (2013.01); *G09G 3/3607* (2013.01); *G02F 1/133514* (2013.01); *G02F 1/134336* (2013.01); *G02F 2201/123* (2013.01); *G02F 2201/52* (2013.01); *G02F 2203/30* (2013.01)

(58) Field of Classification Search
CPC .................................................. G02F 2201/52
See application file for complete search history.

(56) References Cited

U.S. PATENT DOCUMENTS

| 2007/0127040 A1* | 6/2007 | Davidovici | ............ | G02B 5/201 356/629 |
| 2010/0283807 A1* | 11/2010 | Hsieh | .................. | G09G 3/3648 345/694 |
| 2011/0216272 A1* | 9/2011 | Yoshida | ................ | G02F 1/1333 349/84 |

(Continued)

FOREIGN PATENT DOCUMENTS

JP 2015-197461 A 11/2015

*Primary Examiner* — Paul C Lee
(74) *Attorney, Agent, or Firm* — Oblon, McClelland, Maier & Neustadt, L.L.P.

(57) ABSTRACT

According to one embodiment, a display device includes a plurality of red subpixels, a plurality of green subpixels, and a plurality of blue subpixels, wherein, in a first direction, the red subpixel and the green subpixel, the green subpixel and the blue subpixel, and the blue subpixel and the red subpixel are arranged to be adjacent to each other, and in a second direction, the red subpixel and the blue subpixel, the blue subpixel and the green subpixel, and the green subpixel and the red subpixel are arranged to be adjacent to each other, and in the subpixels, as to subpixel columns adjacent to each other, when an image signal of the same gradation is input with respect to the subpixels of same color, brightness of one subpixel column is higher than that of another subpixel column.

6 Claims, 9 Drawing Sheets

(56) References Cited

U.S. PATENT DOCUMENTS

2016/0057396 A1\* 2/2016 Phan ................. G02F 1/133514
　　　　　　　　　　　　　　　　　　　　　　348/266
2016/0342043 A1\* 11/2016 Nakanishi ............ G09G 3/3225
2018/0315385 A1\* 11/2018 Ikeda ................... G09G 3/3607

\* cited by examiner

FIG. 1A
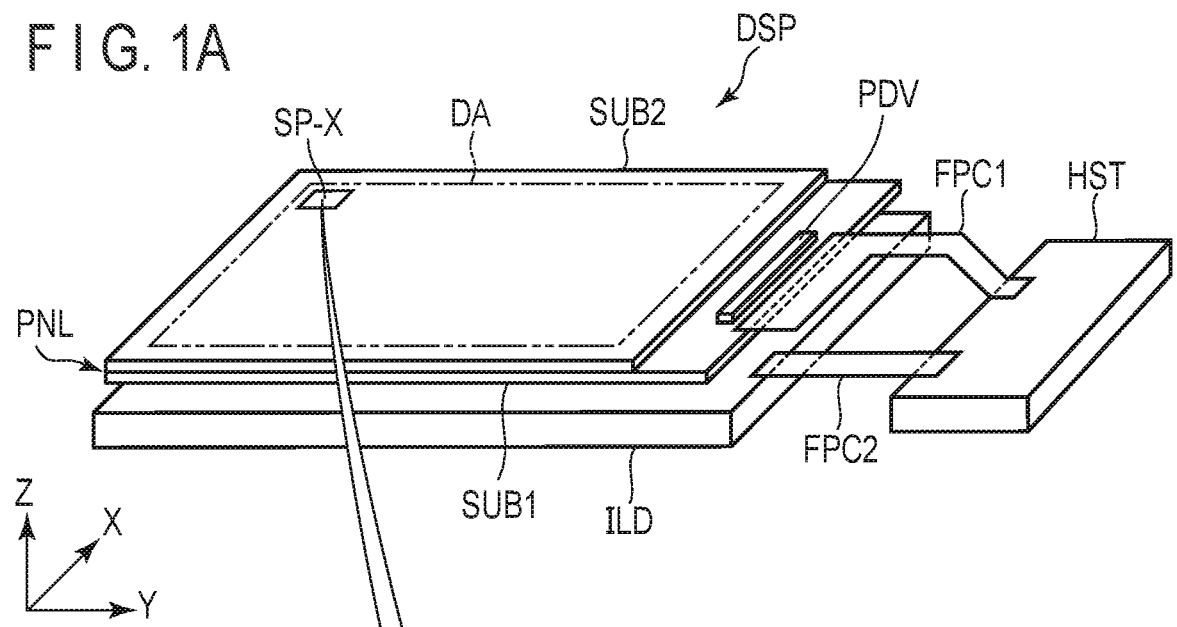
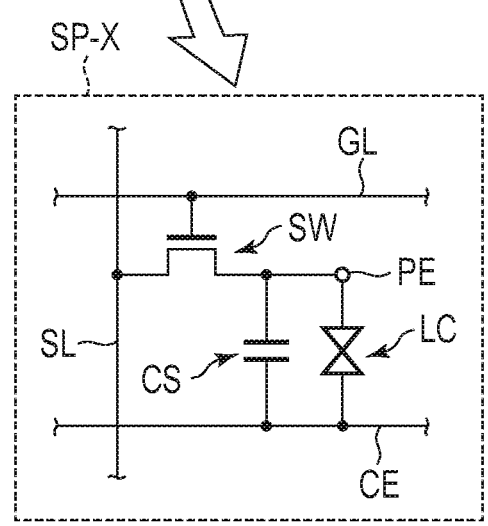
FIG. 1B

DISPLAY DEVICE COMPRISING A PLURALITY OF FIRST AND SECOND SUBPIXELS WHEREIN COMPONENTS OF ONE SUBPIXEL OF THE FIRST SUBPIXELS ARE DISTRIBUTED TO THE PLURALITY OF SECOND SUBPIXELS

CROSS-REFERENCE TO RELATED APPLICATIONS

This application is based upon and claims the benefit of priority from Japanese Patent Application No. 2020-095484, filed Jun. 1, 2020, the entire contents of which are incorporated herein by reference.

FIELD

Embodiments described herein relate generally to a display device.

BACKGROUND

Display devices including subpixels of multiple primal colors have been developed.

BRIEF DESCRIPTION OF THE DRAWINGS

FIG. 1A illustrates the structure of a display device of an embodiment.

FIG. 1B illustrates the structure of the display device of the embodiment.

DETAILED DESCRIPTION

Figure 2:
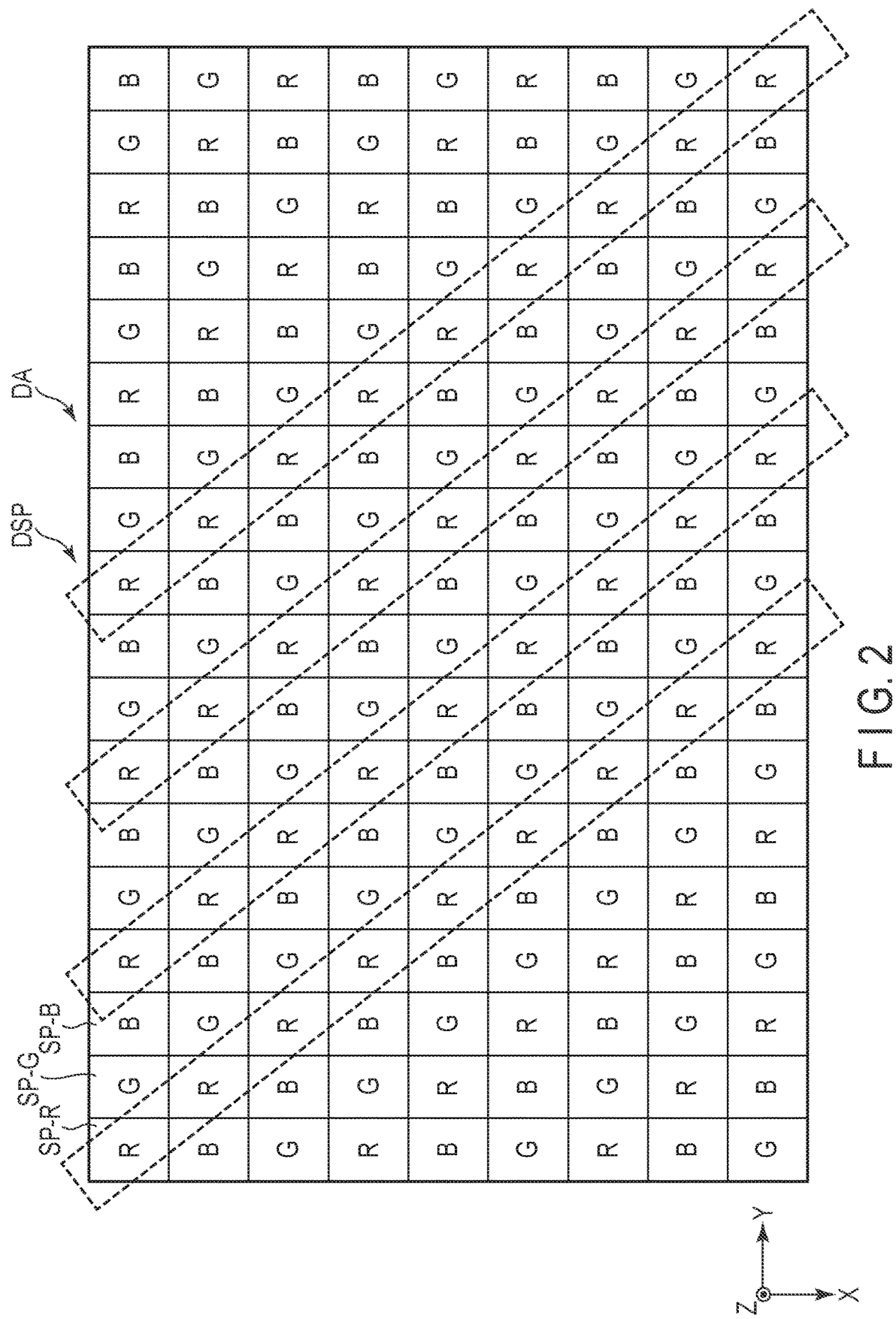
FIG. 2 is a schematic view of pixel arrangement of subpixels of the embodiment.

In general, according to one embodiment, a display device including: a display area; a plurality of subpixels disposed on the display area, the subpixels arranged in a matrix in a first direction and a second direction crossing the first direction; and a controller configured to drive the subpixels, wherein the subpixels include a plurality of red subpixels, a plurality of green subpixels, and a plurality of blue subpixels, and, in the first direction, the red subpixel and the green subpixel, the green subpixel and the blue subpixel, and the blue subpixel and the red subpixel are arranged to be adjacent to each other, and, in the second direction, the red subpixel and the blue subpixel, the blue subpixel and the green subpixel, and the green subpixel and the red subpixel are arranged to be adjacent to each other, and, in the subpixels, as to subpixel columns adjacent to each other, when an image signal of the same gradation is input with respect to the subpixels of same color, brightness of one subpixel column is higher than that of another subpixel column.

The present application provides a display device which can improve the display quality.

Embodiments will be described hereinafter with reference to the accompanying drawings. The disclosure is merely an example, and proper changes within the spirit of the invention, which are easily conceivable by a skilled person, are included in the scope of the invention as a matter of course. In some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. In the specification and drawings, the same elements as those described in connection with preceding drawings are denoted by like reference numerals, and a detailed description thereof is omitted unless otherwise necessary.

Hereinafter, a display device of an embodiment will be explained with reference to the accompanying drawings.

In the embodiments, a first direction X, second direction Y, and third direction Z are orthogonal to each other; however, they may cross each other at an angle other than 90 degrees. A direction toward the tip of arrow of the third direction Z will be defined as up or above, and a direction opposite to the direction toward the tip of arrow of the third direction Z will be defined as low or below.

Furthermore, phrases such as "a second member above a first member" and "a second member below a first member" may be interpreted as the second member contacting the first member or as the second member being apart from the first member. In the latter case, a third member may be interposed between the first member and the second member. On the other hand, phrases such as "a second member on a first member" and "a second member under a first member" will be interpreted as the second member contacting the first member.

Furthermore, an observation position to observe a display device DSP is hypothetically set in the tip side of arrow of the third direction Z, and seeing an X-Y plan view defined by the first direction X and the second direction Y from the observation position will be referred to as plan view. Seeing a cross-sectional view of the display device DSP along an X-Z plan view defined by the first direction X and the third direction Z, or along a Y-Z plan view defined by the second direction Y and the third direction Z will be referred to as cross-sectional view.

Embodiment

FIGS. 1A and 1B illustrate the structure of the display device of the present embodiment. FIG. 1A is a schematic perspective view of the structure of the display device. The display device DSP of FIG. 1A includes a display panel PNL. The display panel PNL is rectangular in this example. In the example depicted, the short sides of the display panel PNL are parallel to the first direction X while the long sides thereof are parallel to the second direction Y. The third direction Z corresponds to the thickness direction of the display panel PNL. The main surface of the display panel PNL is parallel to the X-Y plan defined by the first direction X and the second direction Y.

The display panel PNL includes a first substrate SUB1 (array substrate), second substrate SUB2 (counter substrate) disposed to be opposed to the first substrate SUB1, and liquid crystal layer (which is not shown) formed between the first substrate SUB1 and the second substrate SUB2. Note that a panel driver PDV (controller) configured to drive the display panel PNL is mounted on the first substrate SUB1, for example.

Furthermore, a host device HST is disposed outside of the display panel PNL, and the host device HST is connected to the display panel PNL via a flexible printed circuit FPC1 and the panel driver PDV.

The display panel PNL includes a display area DA in which an image is displayed. In the display area DA (display panel PNL), a plurality of pixels PX and subpixels SPX included in the pixels PX are arranged (aligned). The subpixels SPX will be described later.

The panel driver PDV as a controller is, for example, configured to receive image signals output from the host device HST and to drive each subpixel SPX arranged in the display area DA based on the image signals in order to display an image on the display panel PNL.

In the lower side of the first substrate SUB1 (that is, in the rear surface side of the display panel PNL), an illumination device ILD configured to illuminate the display panel PNL is disposed. A flexible printed circuit FPC2 connects the illumination device ILD to the host device HST. Light emitting diodes (LEDs) are used as a light source of the illumination device ILD, for example. In this embodiment, the illumination device ILD is disposed in the rear surface side of the display panel PNL; however, a front light which is disposed in the display surface side of the display panel PNL may be used. Or, an illumination device using a light guide plate and LEDs arranged in the sides of the light guide plate may be used, or an illumination device using light source spots in which light emitting elements are arranged in a plan.

Note that, in the present embodiment, the display device DSP is a liquid crystal display device using a liquid crystal layer; however, the display device DSP may be, for example, an organic electroluminescence (EL) display device using an organic light emitting layer, or a micro LED display device using micro LEDs.

If the display device DSP is an organic EL display device or a micro LED display device, an illumination device may be omitted from the display device DSP.

Furthermore, in the present embodiment, the display panel PNL may be a transmissive type, or reflective type, or transflective type. The display device DSP with a transmissive type display panel PNL includes an illumination device ILD in the rear surface side of the first substrate SUB1 as described above, and has a transmissive display function by which an image is displayed through selectively transmit the light from the illumination device ILD. The display device DSP with a reflective type display panel PNL includes a light reflection layer in a further rear side of the display panel PNL than is the liquid crystal layer, and has a reflective display function by which an image is displayed through selectively reflect the light from the front surface side (display surface side) of the second substrate SUB2. Note that, an auxiliary light source may be disposed in the front surface side of the reflective type display panel PNL. Furthermore, the reflection layer may be structured such that electrodes in a further rear side of the display panel PNL than is the liquid crystal layer are formed of a reflective material such as metal. The display device DSP with a transflective type display panel PNL has both the transmissive function and the reflective display function.

FIG. 1B illustrates a circuit structure of FIG. 1A. As in FIG. 1B, a subpixel SPX includes, for example, a switching element SW, pixel electrode PE, common electrode CE, and liquid crystal layer LC.

The switching element SW is formed of, for example, a thin film transistor (TFT), and is electrically connected to a scan line GL and a signal line SL. The scan line GL is electrically connected to the switching element SW of each of the pixels PX arranged in the first direction X. The signal line SL is electrically connected to the switching element SW of each of the subpixels SPX arranged in the opposite direction of the second direction Y.

The pixel electrode PE is electrically connected to the switching element SW. The common electrode CE is provided commonly with the pixel electrodes PE. The liquid crystal layer LC (especially, liquid crystal molecules LCM) is driven by a field produced between the pixel electrode PE and the common electrode CE. Specifically, the same potential is applied to the common electrode CE of the pixels PX while a voltage is applied to the pixel electrode PE of each subpixel SPX. Capacitance CS is formed between electrodes of the same potential with the common electrode CE and between electrodes of same potential with the pixel electrodes PE.

The scan line GL, signal line SL, switching element SW, and pixel electrode PE are disposed in the first substrate SUB1. The common electrode CE is disposed in the second substrate SUB2. In the first substrate SUB1, the scan line GL and the signal line SL are electrically connected to the panel driver PDV and the flexible line substrate FPC1.

In the present embodiment, the subpixels SPX include a red (R) subpixel SPR, green (G) subpixel SPG, and blue (B) subpixel SPB. FIG. 2 is a schematic view of pixel arrangement of subpixels of the present embodiment. In FIG. 2, each of blocks arranged in a matrix in the first direction X and the second direction Y represents a subpixel SPX included in the display area DA of the display device DSP. Note that, block of R represents a subpixel SPR, block of G represents a subpixel SPG, and block of B represents a subpixel SPB.

One pixel PX includes a red (R) subpixel SPR, green (G) subpixel SPG, and blue (B) subpixel SPB. In the present embodiment, the subpixel SPR, subpixel SPG, and subpixel SPB may be referred to as first subpixel, second subpixel, and third subpixel, respectively.

In the display area DA of the display device DSP of FIG. 2, the subpixels SPR, SPG, and SPB are arranged in this order along the first direction X. Furthermore, in the display area DA of the display device DSP of FIG. 2, the subpixels SPR and SPG, and the subpixels SPG and SPB are arranged to be adjacent to each other in the first direction X. Furthermore, the subpixels SPR and SPB, subpixels SPB and SPG, and subpixels SPG and SPR are arranged to be adjacent to each other in the second direction Y.

Specifically, along the first direction X, the subpixels SPR, SPG, and SPB are arranged in this order. In the display area DA, along the second direction Y, the subpixels SPR, SPB, and SPG are arranged in this order. Furthermore, in the display area DA, the subpixels SPR, SPB, and SPG are arranged in this order along the second direction Y. In other words, in the opposite direction to the second direction Y, the subpixels SPR, SPG, and SPB are arranged in this order.

In other words, in the first direction X, the subpixel SPG is disposed between the subpixels SPR and SPB. In the first direction, the subpixel SPB is disposed between the subpixels SPG and SPR. In the first direction X, the subpixel SPR is disposed between the subpixels SPB and SPG.

Furthermore, in the second direction Y, the subpixel SPB is disposed between the subpixel SPR and the subpixel SPG. In the second direction Y, the subpixel SPG is disposed between the subpixels SPB and SPR. In the second direction Y, the subpixel SPR is disposed between the subpixels SPG and SPB.

In other words, the subpixels SPX of same color are arranged to be shifted from each other by one in the first direction X and by one in the opposite direction to the second direction Y. That is, the subpixels SPX of same color are arranged diagonally to be shifted from each other by one in every column and row.

That is, the subpixels SPX adjacent to each other in each subpixel row have different colors and the subpixels SPX adjacent to each other in each subpixel column have different colors.

In the present application, the pixel arrangement of FIG. 2 will be referred to as SQy pixel arrangement.

Note that, in the present embodiment, the arrangement of subpixels SPX is not limited to the example of FIG. 2, and the arrangement of subpixels SPX of FIG. 2 may be flipped horizontally, or flipped vertically, or flipped both vertically and horizontally.

Now, a case where the display device DSP performs raster display. In the raster display, an image of same gradation is uniformly displayed in the display area DA of the display device DSP. For example, white or blue is displayed in the entirety of the display area DA.

In such a case, in the display device DSP in which the subpixels SPX of same color are arranged diagonally as in FIG. 2, the following problem may occur.

That is, if the display device in which the subpixels SPX of same color are arranged diagonally performs the raster display, the subpixels SPX of same color may be recognized as a continuous object as a streak extending diagonally. Such a streak is obvious if the definition of the display device DSP is lower. Furthermore, apart from the raster display, such a streak will also be obvious if the part of same gradation is greater in a display image.

Such a diagonal streak may decrease the display quality of the display device DSP.

The present embodiment provides a display device which can suppress the decrease of display quality caused by the above-mentioned diagonal streak. In the display device DSP of the present embodiment, brightness of adjacent subpixel columns differs in the subpixels SPX. Specifically, a column of subpixels brightness of which is higher (will be referred to as light subpixels in the present embodiment), and a column of subpixels brightness of which is lower (will be referred to as dark subpixels in the present embodiment) are arranged alternately. That is, one of the subpixel columns adjacent to each other is brighter than the other. In other words, a dark subpixel column is disposed between light subpixel columns arranged every other column. In other words, the odd-numbered subpixel column is one of a light subpixel column and a dark subpixel column, and the even-numbered subpixel column is the other thereof.

Note that the light subpixel and the dark subpixel will be determined based on the gradation input in the subpixels SPX. The details will be explained later.

In other words, in the subpixels SPX, the brightness of the subpixels SPX adjacent to each other in the first direction X differs, and the brightness of the subpixels SPX adjacent to each other in the second direction Y is the same. Furthermore, in the first direction X, between two subpixels SPX of same brightness, one subpixel SPX of different brightness is disposed. The brightness of one of two subpixels SPX adjacent to each other in the first direction X is higher than that of the other.

Figure 3:
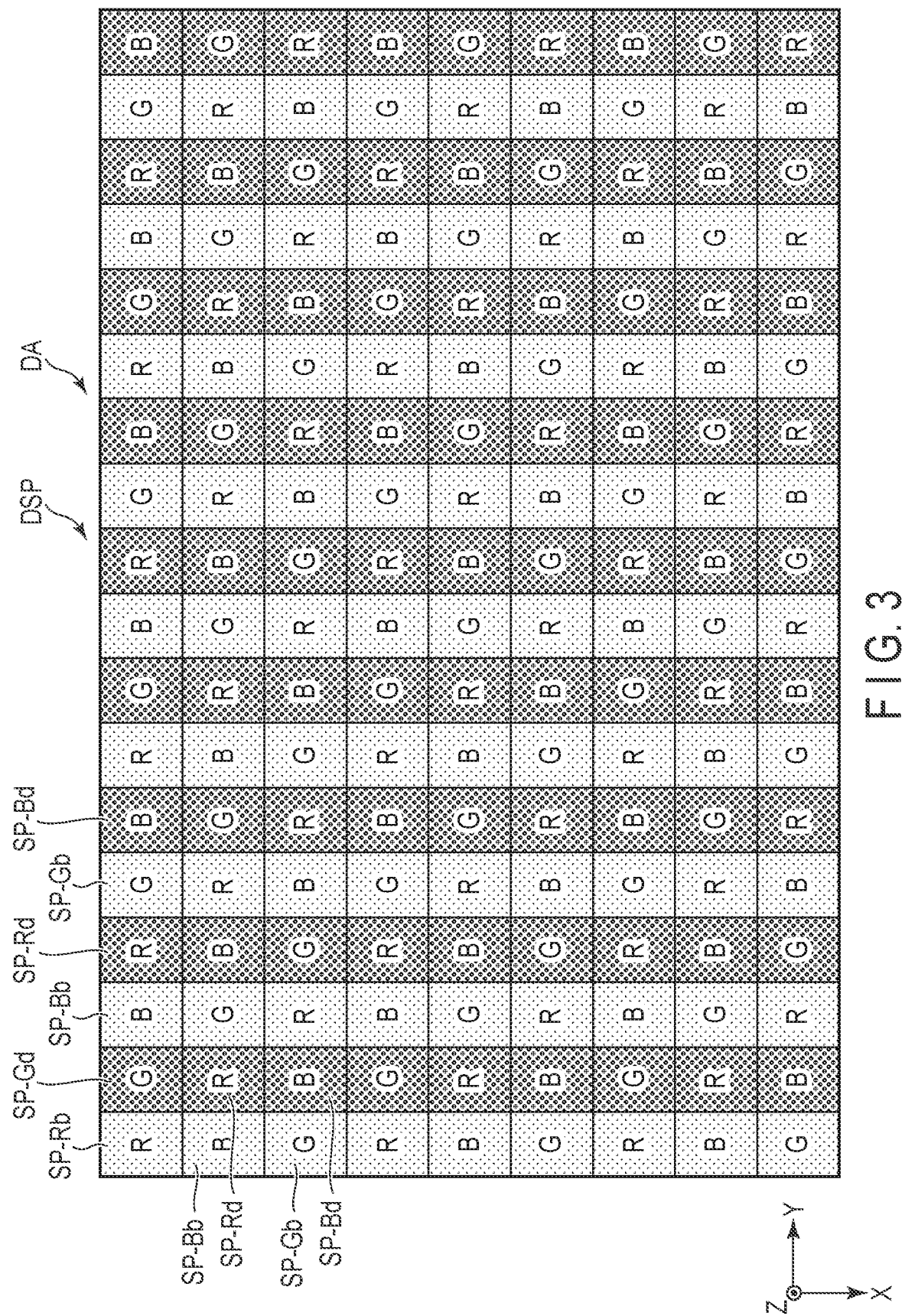
FIG. 3 is a schematic view of pixel arrangement of the subpixels of the embodiment.

FIG. 3 is a schematic view of pixel arrangement of the subpixels of the present embodiment. In FIG. 3, a subpixel SPX of lightly dotted is a light subpixel, and a subpixel SPX of tightly dotted is a dark subpixel.

In the display area DA of the display device DSP of FIG. 3, light subpixel columns and dark subpixel columns are arranged alternately. In the display area DA of FIG. 3, the odd-numbered column is the light subpixel column, and the even-numbered column is the dark subpixel column. Note that the order of the odd-numbered columns and the even-numbered columns is not limited thereto. That is, the odd-numbered column may be the dark subpixel column and the even-numbered column may be the light subpixel column.

The display area DA of FIG. 3 includes a subpixel SPRb as a light subpixel of the subpixel SPR, subpixel SPRd as a dark subpixel of the subpixel SPR, subpixel SPGb as a light subpixel of the subpixel SPG, subpixel SPGd as a dark subpixel of the subpixel SPG, subpixel SPBb as a light subpixel of the subpixel SPB, and subpixel SPBd as a dark subpixel of the subpixel SPB.

For example, in the subpixels SPX of the first row of the display area DA, along the first direction X, the subpixels SPRd, SPGb, SPBd, SPRb, SPGd, and SPBd are arranged repeatedly in this order. Furthermore, for example, in the first column of the display area DA, along the opposite direction of the second direction Y, the subpixels SPRd, SPGd, and SPBd are arranged repeatedly in this order. In the second column of the display area DA, along the opposite direction of the second direction Y, the subpixels SPGd, SPBd, and SPRd are arranged repeatedly in this order.

Figure 4:
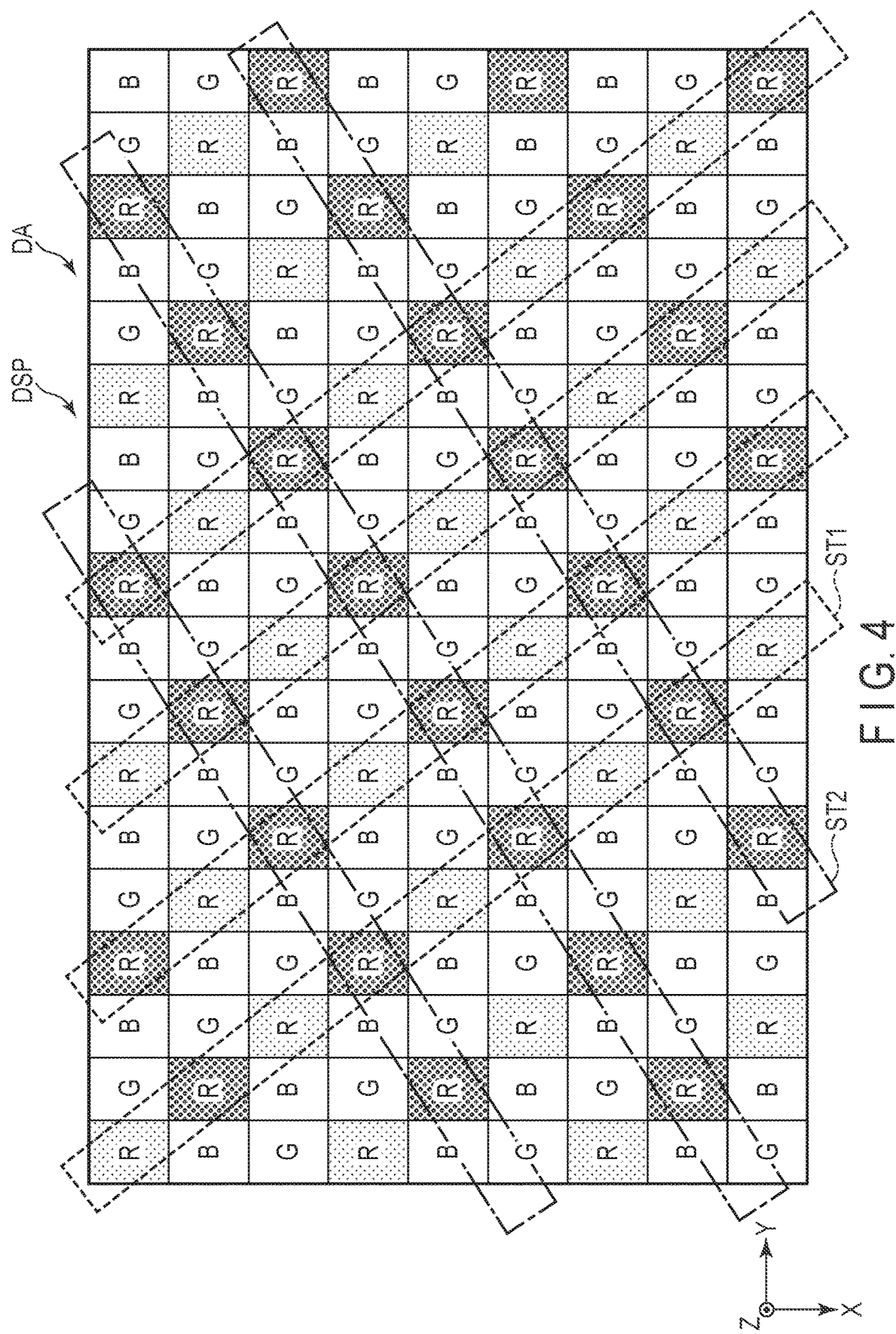
FIG. 4 is a schematic view of pixel arrangement of the subpixels of the embodiment.

Now, the red (R) subpixels SPR will be used in this explanation. FIG. 4 is a schematic view of the pixel arrangement of subpixels of the embodiment. FIG. 4 illustrates a light subpixels SPRb and a dark subpixel SPRd of the subpixels SPR, and a streak caused by the subpixels SPR.

Specifically, the display device DSP of FIG. 4 includes, as in FIG. 2, a streak ST1 (extending downward to the right) caused by the subpixels SPR shifted by one in the first direction X and shifted by one along the opposite direction of the second direction Y, and also a streak ST2 (extending upward to the right) caused by the subpixels SPR shifted by one along the second direction Y. Note that, in FIG. 4, the streak ST1 is shown in the area surrounded by a dotted line, and the streak ST2 is shown in the area surrounded by the one-dotted broken line.

The reason why the streak ST1 is as stated in the explanation of FIG. 2. The streak ST2 of FIG. 4 is caused because the dark subpixels SPRd are recognized as a streak. As in FIG. 4, the streaks ST1 and ST2 inclined in different directions cancel each other. As a result, both the streaks (ST1 and ST2) become difficult to recognize. Thus, a display device of improved display quality can be achieved.

Now, a method of converting an input to the subpixels SPX in a stripe pixel arrangement into an input to the pixel arrangement of FIG. 3 will be explained.

Figure 5A:
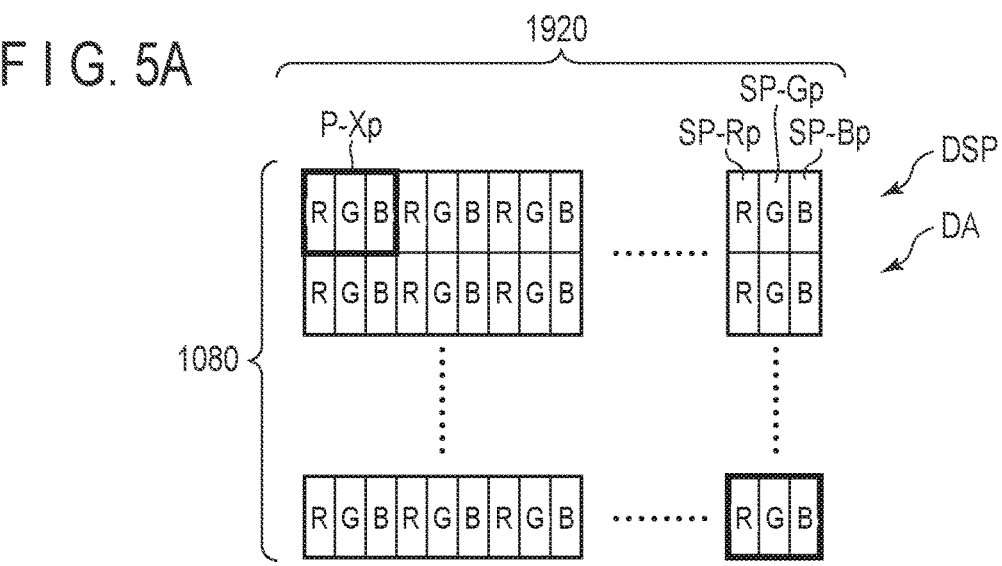
FIG. 5A illustrates the pixel arrangement in a display area of the display device of the embodiment.
Figure 5B:
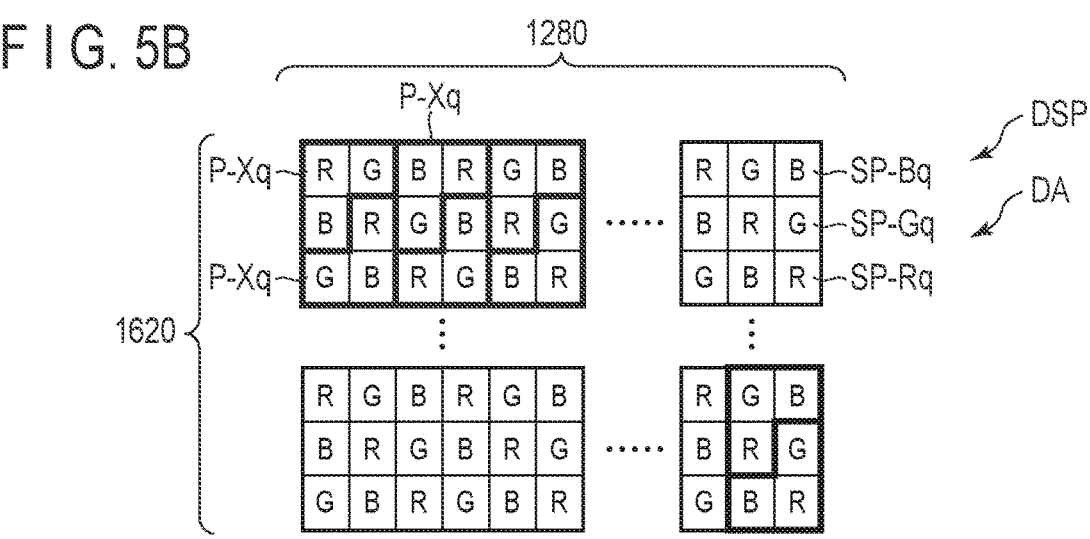
FIG. 5B illustrates the pixel arrangement in the display area of the display device of the embodiment.
Figure 5C:
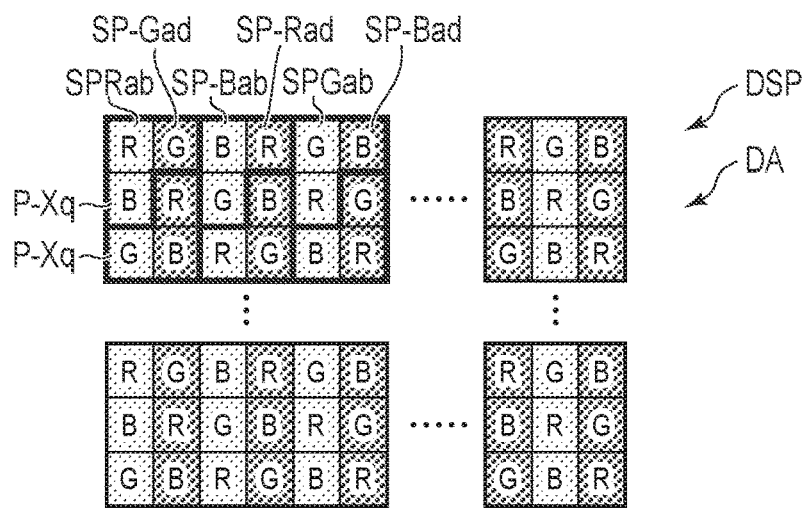
FIG. 5C illustrates the pixel arrangement in the display area of the display device of the embodiment.

FIGS. 5A to 5C illustrate the pixel arrangement in the display area DA of the display device DSP of the embodiment. FIG. 5A is a schematic view of stripe pixel arrangement. In the display device DSP of FIG. 5A, a plurality of subpixels SPX (subpixels SPR, SPG, and SPB) are arranged to each form a stripe shape in the column direction. In other words, a plurality of subpixels SPX of each row of the pixel arrangement are arranged such that the subpixels SPX of same color are adjacent to each other in the column direction and the subpixels SPX of different colors are aligned in the row direction. Such a pixel arrangement is the above-mentioned stripe pixel arrangement.

Furthermore, as stated above, since one pixel PX includes three subpixels SPX (subpixels SPR, SPG, and SPB), it is understood that pixels PX of one column include subpixels SPX of three columns in the display device DSP of FIGS. 5A to 5C. Note that, in FIG. 5A, subpixels SPR, SPG, and SPB, and pixel PX of the stripe pixel arrangement are referred to as subpixels SPRp, SPGp, and SPBp, and pixel PXp, respectively.

Furthermore, the display device DSP of FIG. 5A has a resolution of 1080×1920 (1080 rows×1920 columns). That is, in the display device DSP of FIGS. 5A to 5C, subpixels of 1080×1920 are arranged in each of subpixels SPR, SPG, and SPB.

In the display device DSP of stripe pixel arrangement, subpixels of same color are arranged per column, and thus, manufacturing of a member to display colors such as color filter of a liquid crystal device is easy, which is advantageous.

However, when the display device DSP of stripe pixel arrangement becomes high definition, the width of subpixel columns becomes thinner. Thus, there may possibly be a case where a sufficient area to arrange signal lines SL is not secured.

Thus, in the present embodiment, the display device DSP of SQy pixel arrangement of FIG. 3 will be used. FIG. 5B is a schematic view of the SQy pixel arrangement as with FIG. 3. The display device DSP has, as compared to the stripe pixel arrangement, ⅔ resolution in the first direction X, and 3/2 resolution in the second direction Y. For example, if the stripe pixel arrangement exerting the resolution of 1080×1920 (1080 rows×1920 columns) of FIG. 5A is converted into the SQy pixel arrangement, the resolution becomes 1620×1280 as in FIG. 5B.

In other words, the length of one subpixel SPX in the first direction X (lateral width) becomes 3/2 of that of the stripe pixel arrangement. Similarly, the length of one subpixel SPX in the second direction Y (vertical width) becomes ⅔ of that of the stripe pixel arrangement. Since the lateral width of the subpixel SPX increases, the width of the signal line SL can be secured.

Note that, in FIG. 5B, subpixels SPR, SPG, and SPB, and pixel PX of the SQy pixel arrangement are referred to as subpixels SPRq, SPGq, and SPBq, and pixel PXq, respectively.

However, the stripe pixel arrangement and the SQy pixel arrangement have different shapes, and thus, image signals to the subpixels SPX of the stripe pixel arrangement must be converted into the image signals of the SQy pixel arrangement.

FIGS. 6A, 6B, 7A, and 7B illustrate the conversion from the stripe pixel arrangement into the SQy pixel arrangement. For easier understanding of the figures, in FIGS. 6A, 6B, 7A, and 7B, red subpixels SPR (SPRp and SPRq) are depicted with vertical lines, green subpixels SPG (SPGp and SPGq) are depicted with diagonal lines, and blue subpixels SPB (SPBp and SPBq) are depicted with horizontal lines.

Figure 6A:
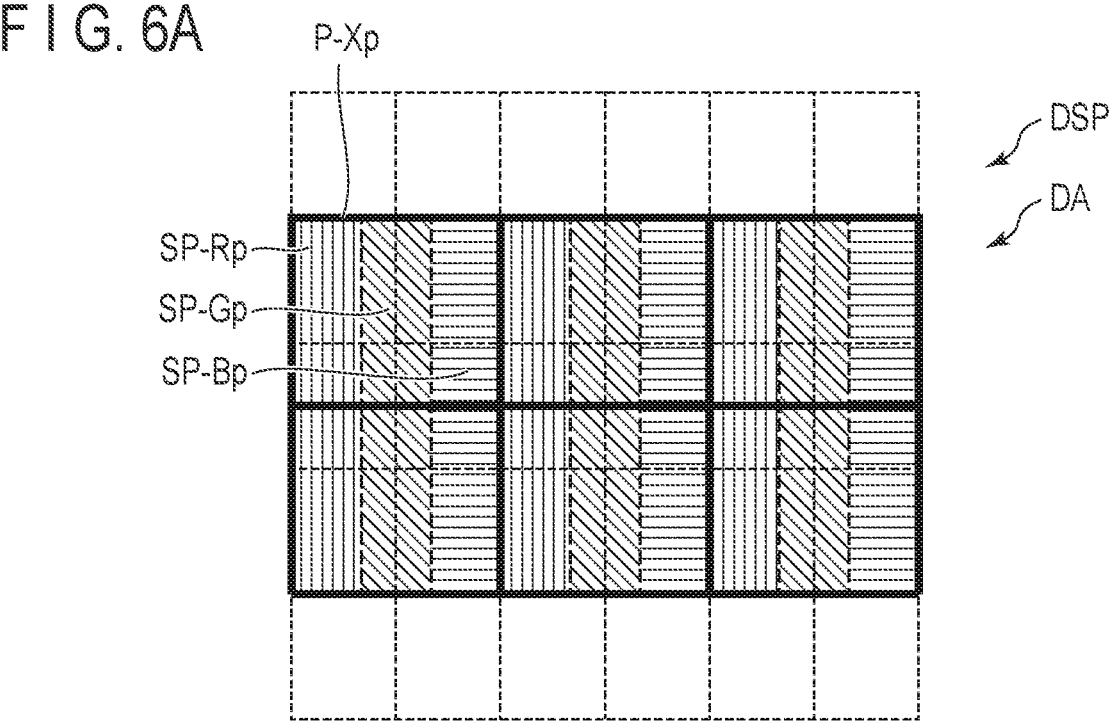
FIG. 6A illustrates conversion of stripe pixel arrangement to SQy pixel arrangement.

The display device DSP of FIG. 6A includes subpixels SPX of the stripe pixel arrangement, and one pixel PXp includes three subpixels SPRp, SPGp, and SPBp arranged in the first direction X.

Figure 6B:
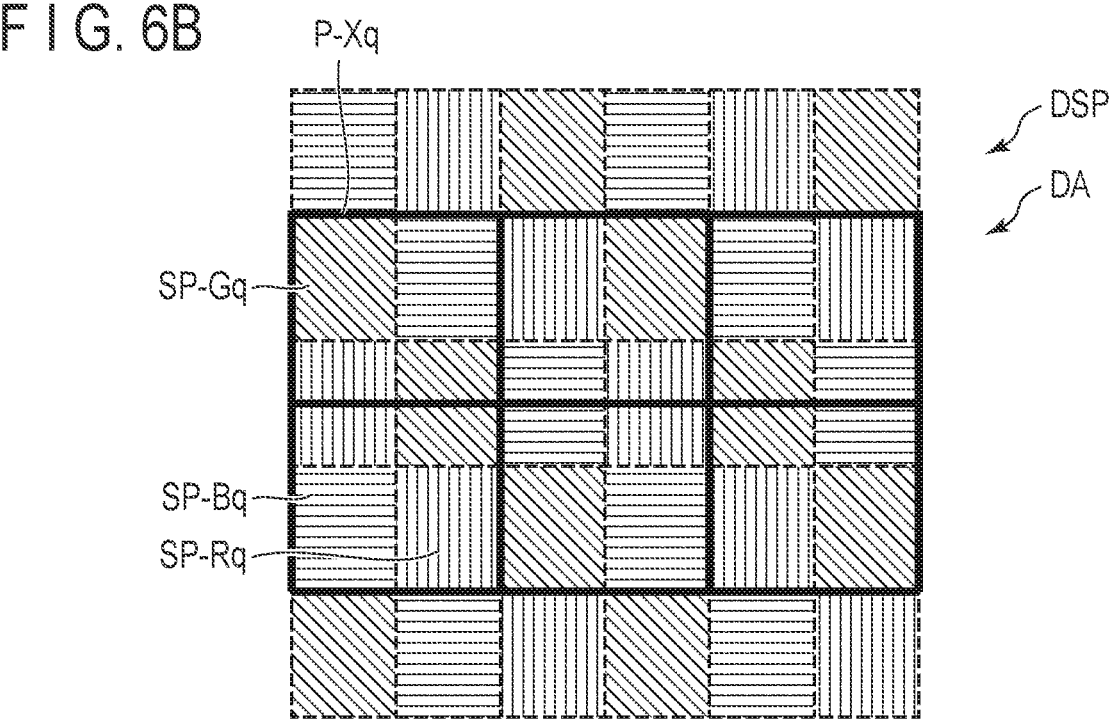
FIG. 6B illustrates conversion of stripe pixel arrangement to SQy pixel arrangement.

On the other hand, the display device DSP of FIG. 6B includes subpixels SPX of the SQy pixel arrangement. As in FIG. 6B, the pixels PXp of the stripe pixel arrangement of two rows by one column are converted into the subpixels of the SQy pixel arrangement of three rows by two columns.

Figure 7A:
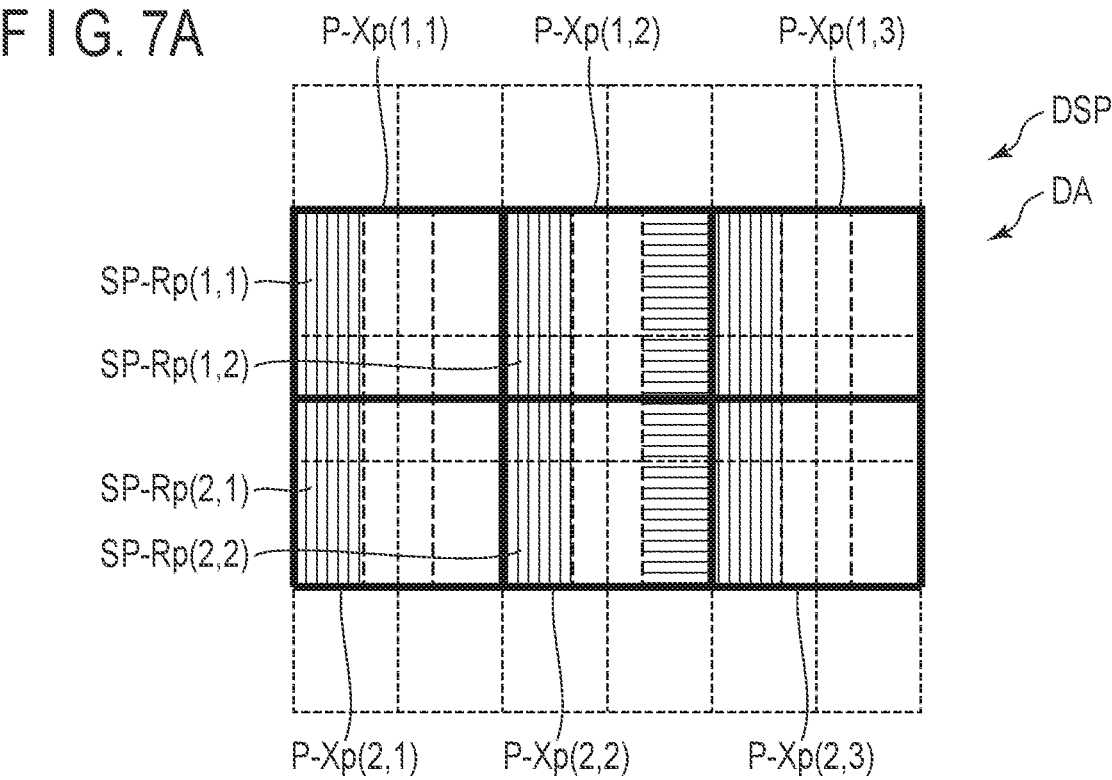
FIG. 7A illustrates conversion of stripe pixel arrangement to SQy pixel arrangement.
Figure 7B:
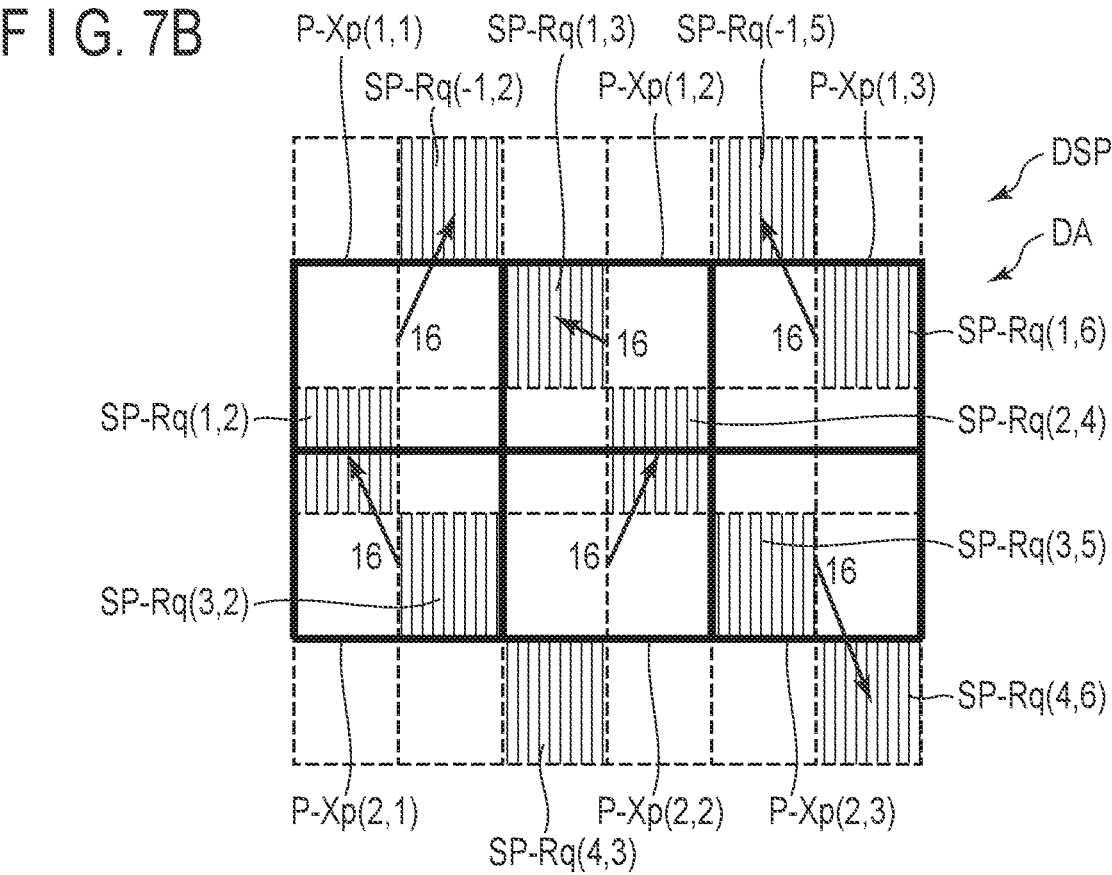
FIG. 7B illustrates conversion of stripe pixel arrangement to SQy pixel arrangement.

In FIGS. 7A and 7B, only red subpixels SPR (SPRp and SPRq) are shown. As in FIG. 7A, pixels PXp included in two-row by two-column of the stripe pixel arrangement will be referred to as pixels PXp (1,1), PXp (1,2), PXp (2,1), and PXp (2,2). The pixel PXp (1,1) includes subpixel SPRp (1,1), pixel PXp (1,2) includes subpixel SPRp (1,2), pixel PXp (2,1) includes subpixel SPRp (2,1), and pixel PXp (2,2) includes subpixel SPRp (2,2). Note that, in FIGS. 7A and 7B, components of the image signal input to each subpixel SPRp are 16.

Two-row by two-column pixels PXp of the stripe pixel arrangement is converted into three-row by four-column subpixels of the SQy pixel arrangement. As in FIG. 7B, components 16 of the subpixel SPRp (1,1) (pixel PXp (1,1)) are input to subpixel SPRq (−1,2). Note that the subpixel SPRq (−1,2) indicates subpixel SPRq one row before the pixel PXp included in the two-row by two-column stripe pixel arrangement and second column subpixel SPRq.

Components 16 of the subpixel SPRp (2,1) (pixel PXp (2,1)) are input to subpixel SPRq (1,2). Components 16 of the subpixel SPRp (1,2) (pixel PXp (1,2)) are input to subpixel SPRq (1,3). Components 16 of the subpixel SPRp (2,2) (pixel PXp (2,2)) are input to subpixel SPRq (2,4).

Note that the same conversion is performed with respect to the other subpixels SPRp (pixels PXp).

Conversion of the components of one subpixel SPRp of the stripe pixel arrangement into one subpixel SPRq of the SQy pixel arrangement as described above will be referred to as mapping process in the present embodiment.

Note that, in the aforementioned description, the mapping process of red subpixels SPR has been explained, and the same process is performed in the green subpixels SPG and blue subpixels SPB. Thus, conversion of the image signals of the stripe pixel arrangement to the SQy pixel arrangement is achieved.

Note that, in the present embodiment, the subpixels SPRp, SPGp, and SPBp may be referred to as first red subpixel, first green subpixel, and first blue subpixel, respectively, and if there is no need of distinguishing the colors, they may be referred to as first subpixel. Furthermore, the subpixels SPRq, SPGq, and SPBq may be referred to as second red subpixels, second green subpixel, and second blue subpixel, respectively, and if there is no need of distinguishing the colors, they may be referred to as second subpixel.

If the image signal input to the first subpixel is a first image signal, and the image signal input to the second subpixel is a second image signal, in FIGS. 7A and 7B, the second image signal of one second subpixel is input to one first subpixel of the same color.

As above, the conversion of the image signal of the square pixel arrangement to the SQy pixel arrangement is performed. Now, light subpixels and dark subpixels are disposed alternately in the SQy pixel arrangement of FIG. 5B will be shown in FIG. 5C.

As in FIG. 5C, one pixel PXq includes red (R), green (G), and blue (B) subpixels. At the same time, one pixel PXq includes two light subpixels and one dark subpixel, or one light subpixel and two dark subpixels.

Figure 8:
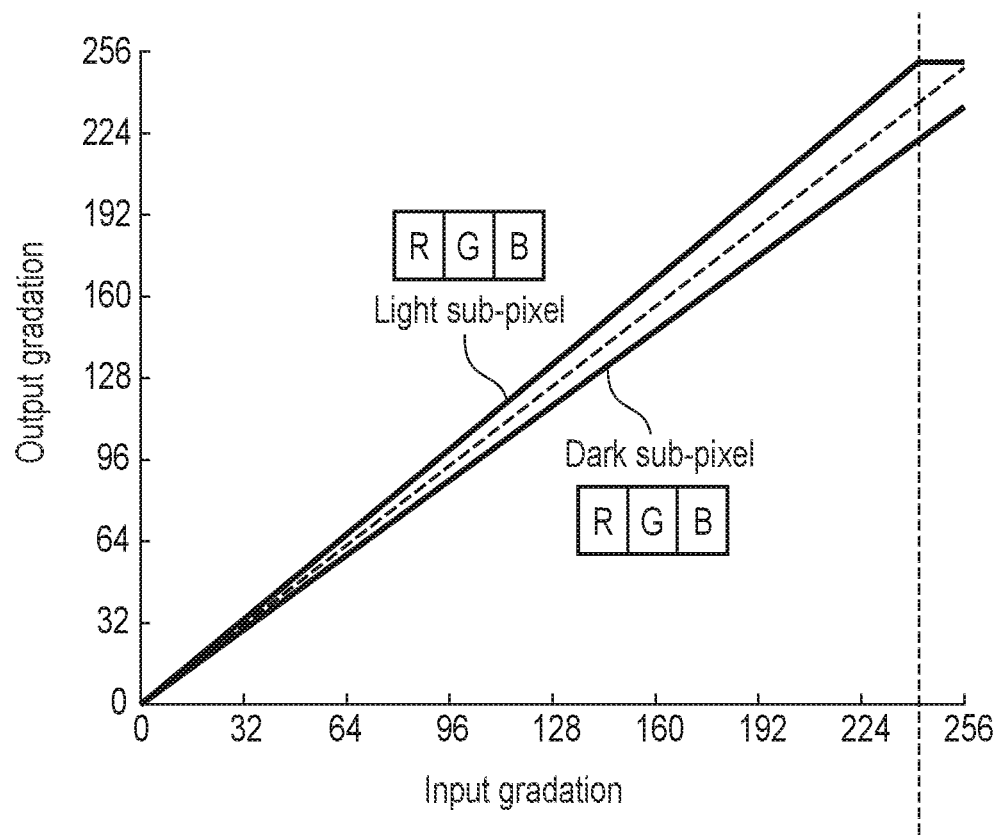
FIG. 8 illustrates a relationship between input gradation and output gradation of light subpixel and dark subpixel.

FIG. 8 illustrates a relationship between input gradation and output gradation of light subpixels and dark subpixels. FIG. 8 illustrates a state where the input gradation and the output gradation are equal with a dotted line. In the light subpixels, the image signal is processed to increase the output gradation with respect to the input gradation. In the dark subpixels, the image signal is processed to increase the output gradation with respect to the input gradation. In the light subpixels and the dark subpixels, a difference of the output gradation becomes small in the low gradation side, and a difference of the output gradation becomes great in the high gradation side.

Note that, the gradation close to the maximum gradation, for example, 250 or above, the output gradation of the light subpixels becomes saturated, and the output gradation becomes constant (maximum gradation) even if the input gradation is increased. In that case, the output gradation of the dark subpixels is defined such that a difference of the gradation (brightness difference) between the dark subpixels and light subpixels appears. There may be a possibility that the output gradation may not reach the maximum value in the dark subpixels even if the input gradation is increased; however, a difference of the gradation (brightness difference) between the light subpixels and the dark subpixel should appear.

The columns of the light subpixels and the dark subpixels explained with reference to FIG. 8 are arranged alternately, and thus, the pixel arrangement shown in FIGS. 4 and 5C can be achieved. Thus, even if the streak ST1 extending downward to the right can be canceled by the streak ST2 extending upward to the right.

Note that, the display device DSP of the present embodiment may be driven such that the polarity of the voltage applied to the pixel electrode PE and the common electrode CE may be reversed per two subpixel columns at a certain interval. Such a drive will be referred to as two column reverse drive in the present embodiment.

For example, if the voltage applied to the common electrode CE is a reference voltage, a voltage which is higher than the reference voltage (positive (+) polarity) is applied to the pixel electrodes PE of the first and second subpixel columns. Furthermore, a voltage which is lower than the reference voltage (negative (−) polarity) is applied to the pixel electrodes PE of the third and fourth subpixel columns. At a certain interval, the polarity of the voltage applied to the pixel electrodes PE is reversed. Note that the same drive is applied to the fifth columns and thereafter.

According to the aforementioned embodiment, a display device which can improve the display quality can be achieved.

Structural Example 1

Figure 9A:
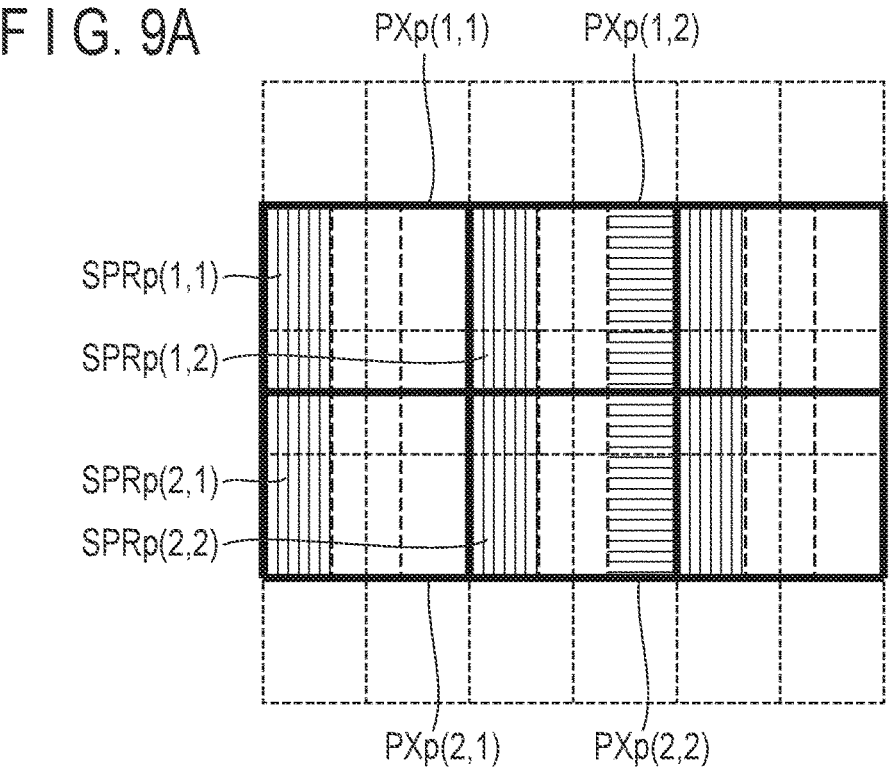
FIG. 9A illustrates another example of the structure of the display device of the embodiment.
Figure 9B:
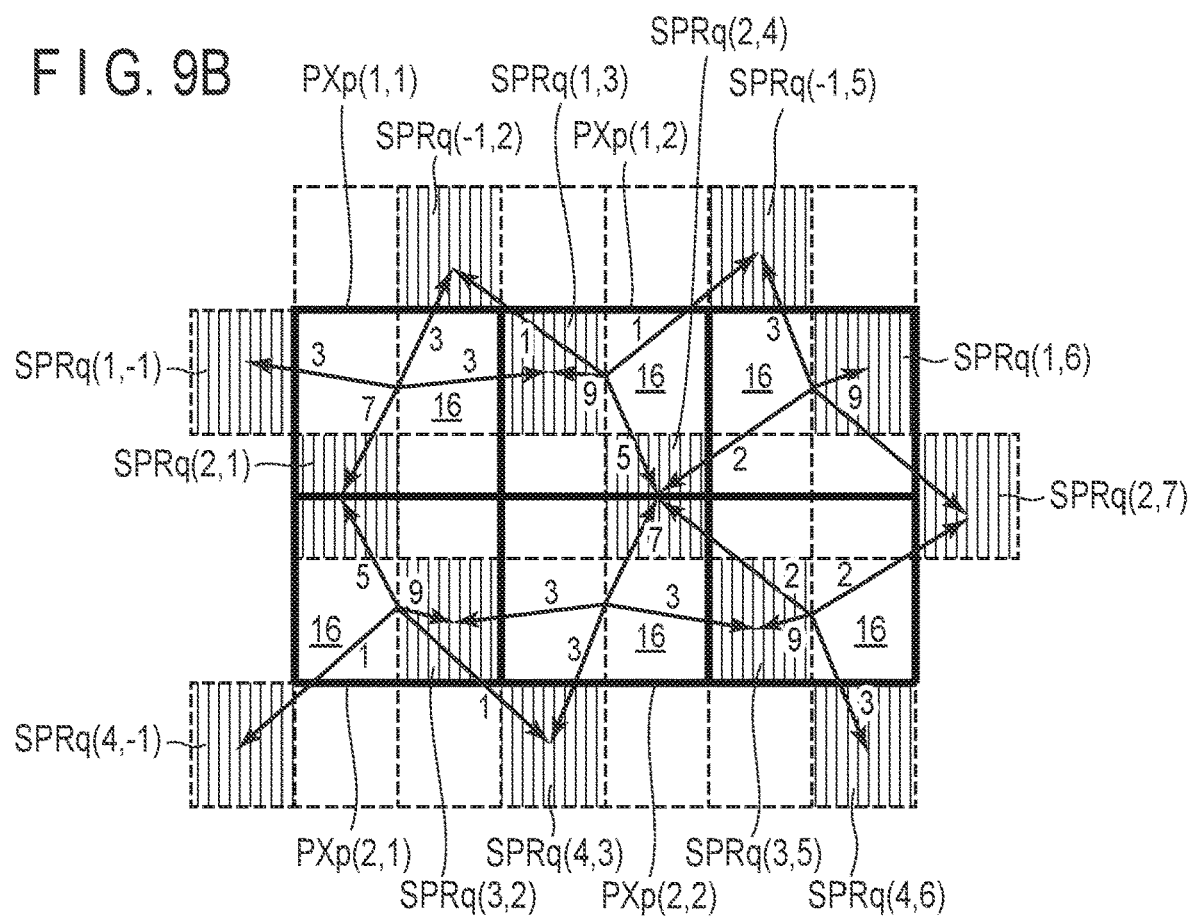
FIG. 9B illustrates another example of the structure of the display device of the embodiment.

FIGS. 9A and 9B illustrate another example of the structure of the display device of the embodiment. The example of FIGS. 9A and 9B performs a rendering process which is different from the example of FIGS. 7A and 7B.

FIG. 9A is the same as FIG. 7A. In FIG. 7B, all components of one subpixel SPRp of the stripe pixel arrangement are converted to one subpixel SPRq of the SQy pixel arrangement. On the other hand, in FIG. 9B, components of one subpixel SPRp of the stripe pixel arrangement are distributed to be input to the subpixel SPRq of the SQy pixel arrangement. That is, unlike FIGS. 7A and 7B, in FIG. 9B, the image signal (corresponding to the second image signal) of one second subpixel (subpixel of the stripe pixel arrangement) are distributed to a plurality of first subpixels of same color (subpixels of the SQy pixel arrangement). The details will be explained below.

In the display device DSP of FIG. 9B, the components of one pixel PXp of the stripe pixel arrangement are distributed to four or more directions. Specifically, in FIG. 9B, subpixels SPRp, SPGp, and SPBp included in one pixel PXp are repeatedly distributed to every three lateral subpixels and two vertical subpixels. Note that the three lateral subpixels are every third subpixel in the first direction X, and the two vertical subpixels are every second subpixels in the second direction Y. Furthermore, the components of the pixel PXp are equal to the gradation of the image signal input to the pixel PXp or the brightness of the pixel PXp.

As in FIG. 9B, components 16 of the subpixel SPRp (1,1) (pixel PXp (1,1)) are distributed to subpixel SPRq (−1,2) by three, subpixel SPRq (1,−1) by three, subpixel SPRq (2,1) by seven, and subpixel SPRq (1,3) by three. Note that the subpixel SPRq (−1,2) indicates subpixel SPRq one row before the pixel PXp included in two-row by two-column of the stripe pixel arrangement and second subpixel SPRq. Furthermore, the subpixel SPRq (1,−1) indicates the first column subpixel SPRq and one column before the pixel PXp included in the two-row and two-column of the stripe pixel arrangement.

Components 16 of the subpixel SPRp (2,1) (pixel PXp (2,1)) are distributed to subpixel SPRq (2,1) by five, subpixel SPRq (4,−1) by one, subpixel SPRq (3,2) by nine, and subpixel SPRq (4,3) by one.

Components 16 of the subpixel SPRp (1,2) (pixel PXp (1,2)) are distributed to subpixel SPRq (−1,2) by one, subpixel SPRq (1,3) by nine, subpixel SPRq (−1,5) by one, and subpixel SPRq (2,4) by five.

Components 16 of the subpixel SPRp (2,2) (pixel PXp (2,2)) are distributed to subpixel SPRq (3,2) by three, subpixel SPRq (2,4) by seven, subpixel SPRq (4,3) by three, and subpixel SPRq (3,5) by three.

Note that the components are similarly distributed with respect to the other subpixels SPRp (pixels PXp).

The same applies to the green subpixels SPG, and the blue subpixels SPB.

Through the aforementioned rendering process, the image signal is input to the pixels SPXq (subpixels SPRq, SPGq, and SPBq) closer to the input image. Thus, the display device DSP of the present example can display an image of higher display quality.

The present example can achieve the advantages of the embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A display device comprising:
a display area;
a plurality of subpixels disposed on the display area, the subpixels arranged in a matrix in a first direction and a second direction crossing the first direction; and a controller configured to drive the subpixels, wherein
the subpixels include a plurality of red subpixels, a plurality of green subpixels, and a plurality of blue subpixels, and
in the first direction, the red subpixel and the green subpixel, the green subpixel and the blue subpixel, and the blue subpixel and the red subpixel are arranged to be adjacent to each other, and
in the second direction, the red subpixel and the blue subpixel, the blue subpixel and the green subpixel, and the green subpixel and the red subpixel are arranged to be adjacent to each other, and
in the subpixels, as to subpixel columns adjacent to each other, when an image signal of the same gradation is input with respect to the subpixels of same color, brightness of one subpixel column is higher than that of another subpixel column,
the subpixels are defined as first subpixels which are arranged in a first arrangement, in which subpixels of same color are arranged adjacent to each other in a column direction and subpixels of different colors are aligned in a row direction,
an image signal of the first subpixel of the first arrangement are distributed to a plurality of second subpixels of same color, where the second subpixels are arranged in a second arrangement, in which the red subpixel, the green subpixel, and the blue subpixel are arranged in this order along the first direction, and the red subpixel, the blue subpixel, and the green subpixel are arranged in this order along the second direction,
components of one subpixel of the first subpixels are distributed to a plurality of second subpixels,
when the components of the one subpixel are defined as 16, a total of the components distributed to the plurality of second subpixels is 16.

2. The display device according to claim 1, wherein, in the display area, the subpixel column of higher brightness and the subpixel column of lower brightness are arranged alternately.

3. The display device according to claim 1, wherein, along the first direction, one of the red subpixels, one of the green subpixels, and one of the blue subpixels are arranged repeatedly in this order, and along the second direction, one of the red subpixel, one of the blue subpixel, and one of the green subpixel are arranged repeatedly in this order.

4. The display device according to claim 1, wherein, in the first direction, the green subpixel is arranged between the red subpixel and the blue subpixel, the blue subpixel is arranged between the green subpixel and the red subpixel, and the red subpixel is arranged between the blue subpixel and the green subpixel, and
in the second direction, the blue subpixel is arranged between the red subpixel and the green subpixel, the green subpixel is arranged between the blue subpixel and the red subpixel, and the red subpixel is arranged between the green subpixel and the blue subpixel.

5. The display device according to claim 1, wherein, in the subpixels, the subpixels of according to same color are arranged diagonally along the first direction and an opposite direction of the second direction.

6. The display device according to claim 1, wherein
input components are defined as the components 16 of the one subpixel of the first subpixels,
output components are defined as a total of first output components, second output components, third output components, and fourth output components,
the first output components are distributed in a subpixel of the second subpixels, which is away by two subpixels along an opposite direction of the first direction and by one subpixel along the second direction from the one subpixel of the first subpixels,
the second output components are distributed in a subpixel of the second subpixels, which is at a same position along the first direction and is away by two subpixels along an opposite direction of the second direction from the one subpixel of the first subpixels,
the third output components are distributed in a subpixel which is away by one subpixel along the first direction and at same positions along the second direction from the one subpixel of the first subpixels,
the fourth output components are distributed in a subpixel which is at a same position along the first direction and is away by two subpixels along the second direction from the one subpixel of the first subpixels,
the total of first output components, second output components, third output components, and fourth output components is 16.

* * * * *